No. 791,829. PATENTED JUNE 6, 1905.
J. E. VON SLAWIK.
PHOTOGRAPHIC PICTURE CARRIER.
APPLICATION FILED DEC. 24, 1903.
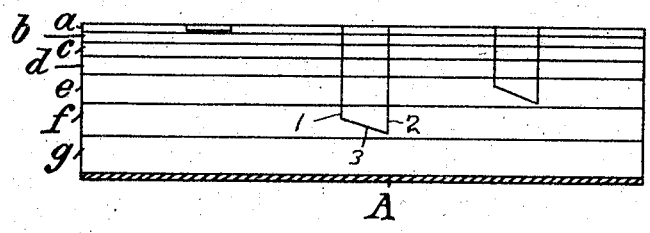

No. 791,829. Patented June 6, 1905.

UNITED STATES PATENT OFFICE.

JOSEF EDLER VON SLAWIK, OF DEBRECZEN, AUSTRIA-HUNGARY, ASSIGNOR TO ADOLF HESEKIEL, OF BERLIN, GERMANY.

PHOTOGRAPHIC-PICTURE CARRIER.

SPECIFICATION forming part of Letters Patent No. 791,829, dated June 6, 1905.

Application filed December 24, 1903. Serial No. 186,468.

*To all whom it may concern:*

Be it known that I, JOSEF EDLER VON SLAWIK, first lieutenant, residing at Debreczen, Austria-Hungary, have invented certain new and useful Improvements in Photographic-Picture Carriers, of which the following is a full, clear, and exact specification.

The subject of my invention is a new picture-carrier, especially adapted for autotype and gum printing.

The invention consists, essentially, of an opaque film of paper or opaque gelatin film having gum or size-color films of various colors applied in definite succession thereto and made sensitive.

The invention is based upon the fact that different colored light-rays penetrate the picture film to different depths; that, for instance, with full-light photographs it is the blue light-rays which influence the photographic plate most strongly, while the green, yellow, and red rays act less strongly in the order stated. Accordingly on the negative obtained the darkest places correspond to the blue, the lightest to the red lights in nature. The fact that the difference of the intensity of the light may cause similar deviations is in general of little significance if the time of exposure is properly selected.

Heretofore it has not been properly understood to arrange the ground-color films black, red, yellow, and blue in such manner as to attain the result desired—that is, pictures with tones clearly defined from each other. This difficulty is overcome according to my invention by the employment of suitable intermediate films.

The essential feature of my invention consists, in the first place, in the ground-color films, especially the top and bottom, being separated from the films lying between each by an intermediate film of non-related color, which, on the one hand, is transparent enough not to stop to too great an extent the passage of the rays of light, while, on the other hand, it must prevent mixing of the ground-colors and produce softening of the light-rays from the color film below.

The accompanying drawing shows one way of carrying out the invention, in which is shown a sheet of sensitized pigmented paper prior to the printing, the support A being shown in section and the color films in edge view.

In the drawing, A is the opaque film of paper or gelatin, and $a\ b\ c\ d\ e\ f\ g$ the color films. Instead of the four films black, red, yellow, and blue usually employed I use six films—black $f$, green $e$, red $d$, yellow $c$, pink $b$, and blue $a$—and I so arrange these films that between black $f$ and red $d$ there is a film of green $e$, and between yellow $c$ and blue $a$ there is a film of pink $b$. The method of employment of the picture-carriers prepared in this way does not differ from the method ordinarily followed in autotype (pigment) printing. In using such and similar autotype or pigment paper for photographic purpose the drawback also arises that the rays of light are able to penetrate the whole of the films, and thus render the gelatin lying directly upon the base insoluble. The result of this is that on subsequently treating in water the picture is difficult to separate from the base, so that injury to the picture and other inconveniences arise. The second feature of the present invention is that for the bottom part of the pigment film a strong intense red-colored layer $g$ of gelatin, gum, or the like is employed, which is not penetrated by the rays of light, and thus cannot be rendered insoluble. In this manner adherence to the base is prevented. At the same time my invention obviates the necessity of the edges of the negatives to be printed having to be provided with an opaque mask, for the red film is able at the edges also, even at places where the negative does not cover the paper, to prevent the light from penetrating to the base. The oblique line 3, which connects the lines 1 2, is to indicate that the rays of light do not penetrate to a uniform depth.

Having thus described my invention, what I claim as new, and desire to secure by Letters Patent, is—

1. A picture-carrier consisting of a support, a number of films of ground-colors thereon and a number of films of non-related colors separating said films of ground-colors, substantially as described.

2. A pigmented paper having means for preventing the passage of light, said means consisting of a strong red layer of suitable material placed below the actual picture film, substantially as described.

In witness whereof I have hereunto set my hand in presence of two witnesses.

JOSEF EDLER VON SLAWIK.

Witnesses:
 HANS HEIMANN,
 WOLDEMAR HAUPT.